THIN MAGNETIC FILM MEMORY WITH ISOLATED SENSE CONDUCTORS

Filed June 10, 1965 3 Sheets-Sheet 1

INVENTORS A. H. BOBECK
J. L. SMITH
BY Herbert M. Shapiro
ATTORNEY

Jan. 27, 1970 A. H. BOBECK ET AL 3,492,663

THIN MAGNETIC FILM MEMORY WITH ISOLATED SENSE CONDUCTORS

Filed June 10, 1965 3 Sheets-Sheet 3

United States Patent Office 3,492,663
Patented Jan. 27, 1970

3,492,663

THIN MAGNETIC FILM MEMORY WITH ISOLATED SENSE CONDUCTORS

Andrew H. Bobeck, Chatham, and James L. Smith, Bedminster, N.J., assignors to Bell Telephone Laboratories, Incorporated, New York, N.Y., a corporation of New York Filed June 10, 1965, Ser. No. 462,816
Int. Cl. G11b 5/00
U.S. Cl. 340—174 14 Claims

ABSTRACT OF THE DISCLOSURE

Digit transients in word-organized thin magnetic film memories are suppressed by positioning sense conductors in positions remote from the bit locations and isolated from the effects of digit currents. It has been found that when flux is switched in a selected bit location, flux spreads through the film to an associated remote position to couple the isolated sense conductor. Digit fields in excess of the switching threshold may be generated without affecting flux in the remote position coupled by the sense conductor.

This invention relates to magnetic memories and, more particularly, to such memories of the thin magnetic film type.

Magnetic memories are frequently characterized by noise which is reduced to within acceptable limits only by reducing the operating margins of the memories. For word-organized memories where orthogonal word and digit conductors define bit locations in magnetic material, typically, at intersections therebetween, the digit transient is frequently a limiting noise factor. More specifically, a digit transient is the output pulse induced in a detector connected to a digit conductor, or, alternatively, to a similarly positioned sense conductor, during a write operation in response to a digit pulse applied to the digit conductor. The digit transient is largely commensurate with the digit pulse; the decay time of the digit transient determines the shortest time at which a following read operation may occur.

For thin film memories where switching occurs on a rotational basis quickly between two orthognoal directions, the digit transient significantly limits operating speeds. In another type of memory wherein a base plate of relatively low reluctance material with posts thereon is juxtaposed with a substantially rectangular hysteresis characteristics overlay, operation is also limited similarly by the decay time of the large digit transient. This latter configuration is often referred to as a waffle-iron configuration.

A prime object of this invention is to avoid digit transients in thin film magnetic memories.

The invention is based on the discovery that when flux in a bit location of a thin film memory reorients itself from a hard to an easy direction in response to the energization of coordinate pairs of word and digit conductors, that flux tends in turn to urge to like orientations the flux then reorienting itself in next adjacent area. The effect is like a tripped set of dominoes, one falling after the other and it attributed primarily to demagnetizing fields about the initial bit location and also to spin coupling between the flux in the bit location and the flux in the next adjacent areas of the film. The effect is turned to account by positioning a sense conductor in a relatively remote position with respect to the bit location yet within range of the "domino effect." The prime advantage is that a sense conductor so positioned is essentially isolated from the corresponding digit conductor and, thus, from the large digit transients resulting from pulses applied thereto during a write operation.

The term "bit location" is used herein to designate an area comparable to a bit location of like memories in the prior art. In accordance with this invention, however, the sense conductor is positioned external to that area. It is believed that the positioning of sense conductors outside of what is normally considered to be the bit location is a departure from prior art thinking. To this extent, although the term "bit location" designates structure so designated by the prior art, that structure in accordance with this invention is the site into which information is written only. The sense conductor is positioned external to the write area in what may be thought of as a detect area.

The range of the domino effect is relatively short in the absence of encouragement thereof. Accordingly, in one embodiment, a waffle-iron configuration is mated to a thin film overlay wherein the posts of the former not only demarcate the bit location but also provide a ready structure for the positioning of sense conductors beyond the bit location yet well within the range of the domino effect.

Specifically, in one embodiment of this invention a thin film is juxtaposed with the posts of a waffle-iron plate, and sets of word and digit conductors are threaded between the rows and columns of posts defining, in the thin film, bit locations at intersections therebetween. A plurality of sense conductors, each associated wih a different digit conductor, are positioned one column of posts apart from corresponding digit conductors. Flux switched in a selected bit location in response to energization of coordinate word and digit conductors during a write operation is accompanied by only a negligible digit transient pulse in an associated sense conductor. During a read operation, however, the remote sense conductor is coupled by flux spread thereto during the previous write operation and now rotated to a hard direction.

In another embodiment, a thin film memory including remote sense conductors in accordance with this invention is similarly operated in the absence of a waffle-iron base plate and posts.

Accordingly, a feature of this invention is a waffle-iron memory including a thin film overlay and orthogonal word and digit conductors for defining in that overlay bit locations by the intersections of those conductors, wherein a plurality of sense conductors are aligned with corresponding digit conductors but spaced apart therefrom by at least one column of posts.

Another feature of this invention is a thin film memory wherein digit and sense conductors are spaced apart to provide substantial isolation therebetween.

The foregoing and further objects and features of this invention will be understood more fully from a consideration of the following detailed description rendered in conjunction with the accompanying drawing wherein.

Figure 1:
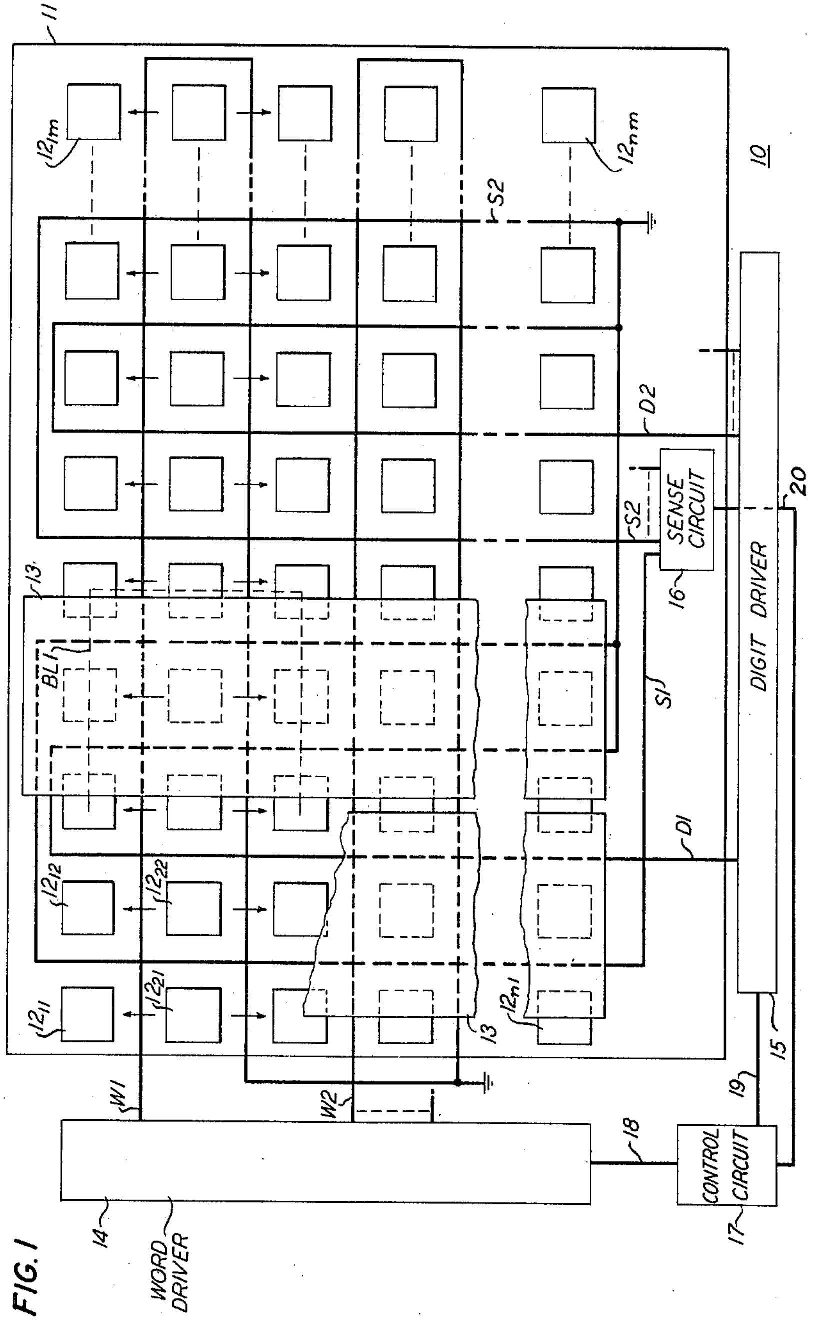
FIG. 1 is a schematic illustration of a memory circuit in accordance with this invention.

FIG. 1 shows a memory circuit 10 comprising a magnetic structure including a base plate 11, posts 12, and overlays 13. The posts 12 are arranged, illustratively, in rows and columns and the designations for the posts include subscripts identifying the row and column in which the designated post is situated. The rows and columns are arranged in increasing order from top to bottom and from left to right, respectively. Each of the overlays 13 overlies three adjacent columns of posts sharing one column of posts with the next adjacent overlay. A plurality of word conductors, designated W1, W2 . . . loop the even numbered rows of posts originating at a word driver 14 and terminating at ground. Similarly, a plurality of digit conductors, designated D1, D2 . . . loop every other odd numbered column of posts originating at a digit driver 15 and terminating at ground. A plurality of sense conductors, designated S1, S2 . . . are oriented as are the digit conductors looping about the posts of the second, third, and fourth columns, and the posts of the sixth, seventh and eighth columns, respectively. The sense conductors similarly originate at a sense circuit 16 and terminate at ground. A control circuit 17 is connected to word driver 14, digit driver 15, and sense circuit 16 via conductors 18, 19, and 20, respectively. The word and digit drivers and the sense and control circuits herein may be any such drivers and circuits operable in accordance with this invention.

The operation of the circuit of FIG. 1 is quite similar to the operation of conventional thin film memories. That is to say, flux in a bit location therein is rotated to a hard direction in response to a word pulse applied to a selected word conductor and rotated to a first or second direction along an easy axis as determined by the polarity of a digit pulse applied to a corresponding digit conductor as the word pulse relaxes. As is well known in such operations, digit pulses are limited in amplitudes to below the amplitude corresponding to the coercive force of the thin film to avoid switching coupled bit locations in nonselected words. As is explained hereinafter, the digit pulse is not so limited in accordance with this invention. In the illustrative embodiments, overlays 13 are of anisotropic material having a hard direction oriented parallel to the columns of posts. The easy axis thereof is oriented parallel to the rows of posts. The overlays are spaced apart (typically 1 mil), illustratively, solely to provide better isolation between flux in the various portions of the memory to insure operation as described.

Figure 2:
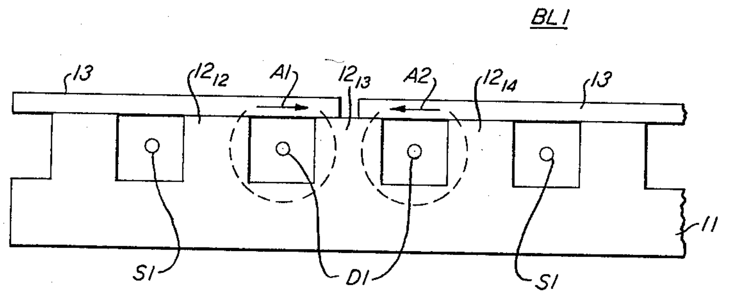
FIGS. 2 and 3 are cross-sectional and top views, respectively, of a portion of the memory circuit of FIG. 1 including a representative bit location thereof.
Figure 3:
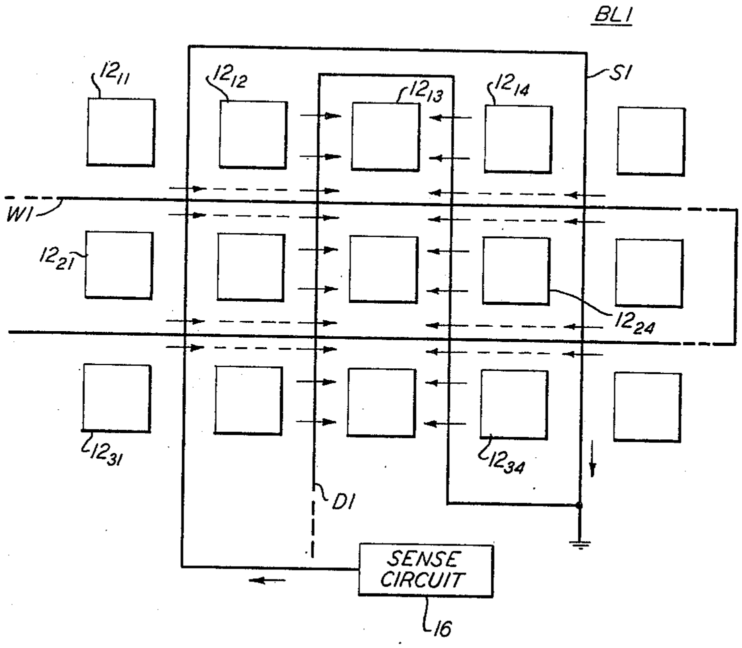

The operation of the circuit of FIG. 1 is understood most easily in terms of a representative bit location thereof. To this end, a representative bit location BL1 of the memory of FIG. 1 is shown in FIGS. 2 and 3. The bit location comprises three adjacent posts (not including the first post) in each of the first three rows of the memory an the overlays there, and, in the illustrative arrangement, four intersections between word and digit conductors define each bit location. Word driver 14, under the control of control circuit 17, applies a word pulse to conductor W1 causing all flux in the overlays 13 between the first three rows of posts to rotate to the hard direction. This is illustrated by the upward and downward directed arrows in FIG. 1 between the posts of the first and second and between the second and third rows, respectively. As the word pulse relaxes, digit driver 15, under the control of control circuit 17, applies a positive digit pulse to conductor D1. In response to the digit pulse, flux in overlay 13 between the second and third columns of posts rotates to the right and the flux in the overlay between the third and fourth columns of posts rotates to the left. The directions are as viewed in FIG. 3. Because of the physical displacement of the sense conductor and, in addition, because of the shielding due to the (ferrite) posts, the "digit to sense" coupling is practically eliminated even though the field due to that pulse would extend beyond the sense conductor in the absence of the posts. Only a negligible digit transient appears on the sense conductor during the foregoing write operation. Flux, however, spreads quickly (much less than 50 nanoseconds) by virtue of the domino effect through the thin film to couple associated sense conductors inducing therein pulses of signal amplitudes far less than normal digit transient amplitudes.

The pattern of flux corresponding to a positive digit pulse during a write operation is arbitrarily assumed to represent a binary "1." A binary "0" is stored in a similar manner by applying a negative digit pulse at the appropriate time. The flux pattern (not shown) is opposite that shown in FIG. 3.

During a subsequent read operation, word driver 14, again under the control of control circuit 17, applies another pulse to word conductor W1 driving a flux in the overlay upward and downward as indicated by the arrows in FIG. 1 as explained previously. Flux rotated in the area to which flux spreads about the representative bit location during the write operation, now rotated during the read operation, induces in sense conductor S1 a signal of a polarity indicated by the arrow adjacent conductor S1 at the sense circuit 16, as shown in FIG. 3.

It may be appreciated that this signal is of a polarity to indicate the storage of a binary 1. Had a zero been stored in a previous write operation, the polarity of the signal would be opposite to that shown. In practice, of course, a pattern of binary values is written into bit locations of a selected word by appropriately applied positive and negative digit pulses. During a later read operation, the word driver rotates flux in all the bit locations coupled thereto and the pattern of binary values provides "positive" and "negative" signals, in parallel, in corresponding sense conductors.

Only the operation of a representative bit location is discussed. The discussion, however, is fully applicable to the operation of all bit locations in the memory. One precaution, however—the representative bit location (that is, the area comparable to bit locations in analogous prior art memories) is shown in FIG. 3 with additional posts, that is, the posts of the first and fifth columns. The bit location actually includes only the posts of the second, third, and fourth columns. The posts of the first and fifth columns are shown as the immediate environment of the representitive bit location to illustrate the configuration of flux spread beyond the bit location to the (detect) area of the remote sense conductor. The posts of the fifth column are shared by the next adjacent bit location, BL2, to the right of the representative bit location as viewed in FIG. 1. The posts of the first column provide flux termination along the extremity of the memory. Posts are also shared by adjacent bit locations in columns.

It is helpful to remember that one well known characteristic of a waffle-iron configuration is that each of the posts therein has a cross section such that it does not saturate when the overlay there becomes saturated. Accordingly, when flux is rotated in, for example, the representative bit location shown in FIGS. 2 and 3, flux closure is through the associated posts. This flux closure, for flux in an easy direction, is represented by broken curves through the posts $\mathbf{12}_{12}$, $\mathbf{12}_{13}$, and $\mathbf{12}_{14}$, and the base plate 11 connecting arrows A1 and A2 as shown in FIG. 2. Importantly, flux closure for all flux in a waffle-iron overlay is available through the closest posts. Hitherto, all such flux was thought to ( and does) close through those posts. Nevertheless, studies of flux patterns in overlays of the configuration described show that although the flux rotated in response to various pulses applied during operation finds closure as expected, flux, in addition, spreads, by virtue of the domino effect during write operations only, along the direction of the rows of posts for a sufficient distance to couple a relatively remote sense conductor. The spreading of flux is indicated in FIG. 3 by arrows intersecting sense conductor S1.

This spreading does not continue without limit through the overlay, a fact which has been mentioned hereinbefore. As may be expected, the relaxation of a word pulse permits flux to reorient to an easy direction. To which easy direction the flux does so reorient is determined by the polarity of the applied digit pulse. In the absence of such a pulse, the flux still reorients itself to first and second easy directions but at random. Whatever the conditions for the reorientation of flux, flux spreading in any direction from a particular bit location examined, encounters flux spreading from a next adjacent bit location. The so-encountered flux may or may not be of like orientation, flux of unlike orientation acting to limit spreading from the particular bit location. Alternatively, the drive pulses may impart insufficient energy to permit flux spreading as far as just described. Flux has been observed to spread, unencouraged, for as far as 20 mils.

The waffle-iron configuration is employed herein primarily to take advantage of this flux spreading. Specifically, the posts of the waffle-iron base plates are dimensioned such that a bit location is defined in the thin film overlay within an area thereof well within the limits of the flux spreading, and, in addition, such that a sense conductor spaced apart from the digit conductors as described is also within the area of flux spreading. Typical dimensions for the structure, as well as materials, et cetera, are given immediately hereinafter. The resulting structure, of course, is also attended by all the well known advantages of the waffle-iron structure.

Figure 4:
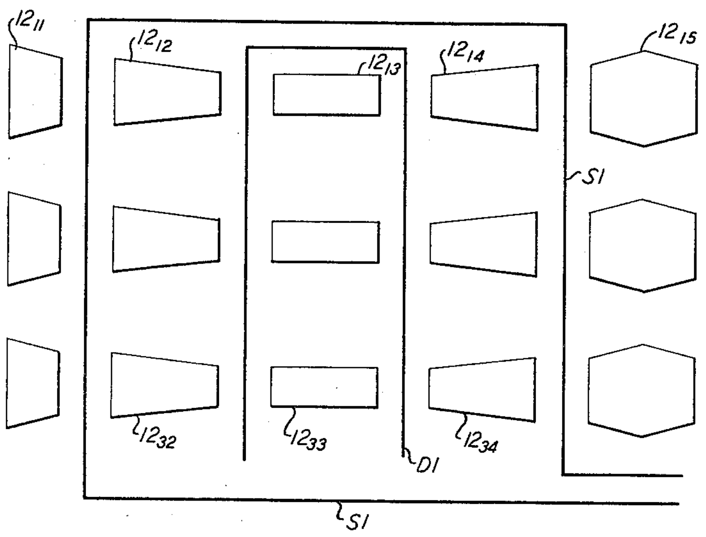
FIG. 4 is an illustration of an alternative post configuration for the portion of the memory circuit shown in FIGS. 2 and 3.

The waffle-iron base plate and posts permit, accordingly, digit-sense decoupling in a structure which is small and well defined. In that structure, flux spreads unencouraged to a remote sense conductor. Actually, sense conductors may be spaced even more remotely from corresponding digit conductors because the described flux spreading may be encouraged to extend further. Such encouragement is provided, for example, by building a "biasing" field into the structure. This is done conveniently by shaping corresponding posts in adjacent rows to form angles with one another, and thus shape the overlay therebetween to provide a variation in fields generated thereacross. Such an arrangement is shown in FIG. 4. This figure shows an arrangement of shaped posts corresponding to like designated posts of FIG. 3. The posts, adjacent the sense conductor S1, however, are shown as wedge-shaped with the ends of the posts adjacent the sense conductor and part of the associated bit location being more closely spaced adjacent the sense conductor than at the other ends of those posts. The posts on the opposite side of the sense conductor are shaped to conform to the posts just described. That is, the latter posts have sides which are essentially parallel to the sides of the former posts and so are spaced further apart at the ends adjacent the sense conductor as shown in FIG. 4. The effect is a variation in the field in the overlay between the posts producing a built-in bias where a word pulse of suitable amplitude for rotating flux between more widely spaced apart ends of posts is more than sufficient to rotate flux between the more closely spaced ends. As the word pulse terminates, a point is reached where the field due to a digit pulse is controlling between the more widely spaced ends but not yet controlling between the more closely spaced ends. As the field due to the word pulse lessens that due to the digit pulse increases. Accordingly, flux between the more closely spaced ends of the posts is held in the hard direction longer than that between the more widely spaced ends permitting the flux orientation of already rotated areas to more readily influence the orientation of flux in the areas between the more closely spaced ends. Thus, flux spreading is encouraged.

Specifically then, in one embodiment of a memory in accordance with this invention there is included a base plate of nickel-zinc ferrite having a permeability of 2000 and a corecive force of about 1 oersted. The plate is one inch by one inch by 0.1 inch. The posts thereon are 10 mils by 10 mils by 10 mils high spaced on 15 mil centers. Word and digit conductors are positioned as shown in FIG. 1 with sense conductors spaced apart one column of posts from corresponding digit conductors. A thin film of 80 percent nickel, 20 percent iron (by weight), 1000 Angstrom units thick deposited on a metal support, is clamped against the posts. Word currents having duration of 100 nanoseconds and amplitudes of 150 milliamperes are employed for write and (here destructive) read operations. Positive and negative digit currents having durations of 100 nanoseconds and amplitudes of 40 milliamperes are employed for write operations. Write transients are negligible and a read-write cycle of less than 200 nanoseconds is realized. In large prior art memories, 30 to 100 nanoseconds must be added to the cycle time to allow the disturbance due to the digit transient to decay. During a read operation, output pulses having duration of 50 nanoseconds and amplitudes of one millivolt are observed. These output pulses are commensurate with output pulses realized in accordance with prior art thin film memories.

In the foregoing description, a metal support is described for the thin film overlay. A glass plate, however, may be used instead of a metal plate for supporting the thin film in accordance with this invention with but slight digit to sense coupling resulting. It has been found further that if, when a glass support is used, the overlay includes not only a thin magnetic film but also a thin backing layer of metal, for example, a 1 mil layer of aluminum, this slight digit to sense coupling is eliminated by eddy current damping.

As is evident from the foregoing discussion, a memory in accordance with this invention not only is substantially free of digit transients but also has higher operating speeds than have been achieved with prior art thin film structures. Such memories have the further and unexpected advantage of extremely wide digit margins. Essentially complete isolation is provided, for example, by the structure of FIG. 1 between the digit conductor and the corresponding sense conductor. Digit pulses producing fields far in excess of the switching threshold may switch flux within nonselected bit locations but do not affect the flux which had spread, during a previous write cycle, to a detect area coupled by a sense conductor. Digit pulses of up to one ampere have been employed with only negligible effect on the direction of flux in adjacent detect areas coupled by corresponding sense conductors. Moreover, even further reductions in cycle time are realizable in accordance with this invention because read and write operations for different bit locations may, ideally, overlap because of the absence of digit transients.

Although waffle-iron posts, as described hereinbefore, conveniently provide well defined and small bit locations with essentially complete isolation between sense and digit conductors, flux spreading in a thin magnetic film, in accordance with this invention, may also be utilized in the absence of waffle-iron posts. For example, thin film memories composed of thin film spots also have flux limited to well defined bit locations by providing closely-spaced ground planes or return paths for drive solenoids. Such memories also enjoy the advantages described for waffle-iron embodiments herein although perhaps to a lesser extent.

Typically, a magnetic thin film memory comprises rectangular spots of magnetic material 1000 to 2000 Angstrom units thick and about 30 mils by 30 mils. The spots, for example, of nickel-iron permalloy are deposited on a nonmagnetic substrate such as glass. Orthogonal sets of word and digit conductors (relatively wide solenoids) overlie the thin film spots forming intersections there, each solenoid having a closely spaced return path which acts to confine the extent of fields thereabout to the spacing between the solenoid and its return path. Sense conductors aligned with the digit solenoids are closely spaced apart from, typically overlie, corresponding digit solenoids to insure good coupling of the sense conductor during a read operation. The minimum width (in the easy direction) for the spots of thin film, for a given film thickness, are dictated by consideration of demagnetizing fields which are inversely proportional to the width of the spot in the easy direction. The demagnetizing fields are kept, advantageously, small. Normally then, thin film spots are relatively wide yet sense conductors are placed to close corresponding digit conductors. Remembering that the amplitude of digit pulses is limited, in accordance with prior art teaching, to those amplitudes providing fields less than the coercive force for the film and that return paths confine field configurations, a bit location may be defined as that portion of a thin film spot in which the field associated with the digit pulse extends beyond the digit solenoid to effect flux rotation directly. In accordance with the prior art teaching, an attempt is made to have the field associated with the digit pulse extend to effect flux rotation throughout the spot. To this end word and digit solenoids are made wide and sense conductors are closely spaced apart from, usually overlying, digit solenoids. In accordance with this invention, in contradistinction, the field associated with the digit pulse (which is not limited to below the coercive force of the material) does not extend to the limits of the film spot, and sense conductors are spaced relatively far apart from corresponding digit solenoids, beyond the area to which that field extends to avoid digit transients, but still to overlie the extended portions of corresponding spots. In accordance with this invention, further, the thin film spots are actually elongated in the direction parallel to the word solenoid, say to 40 or 50 mils. Coupling of the sense conductor during a read operation is, as described hereinbefore, by rotation of flux which had spread in the direction of the word conductor during a preceding write operation.

Figure 5:
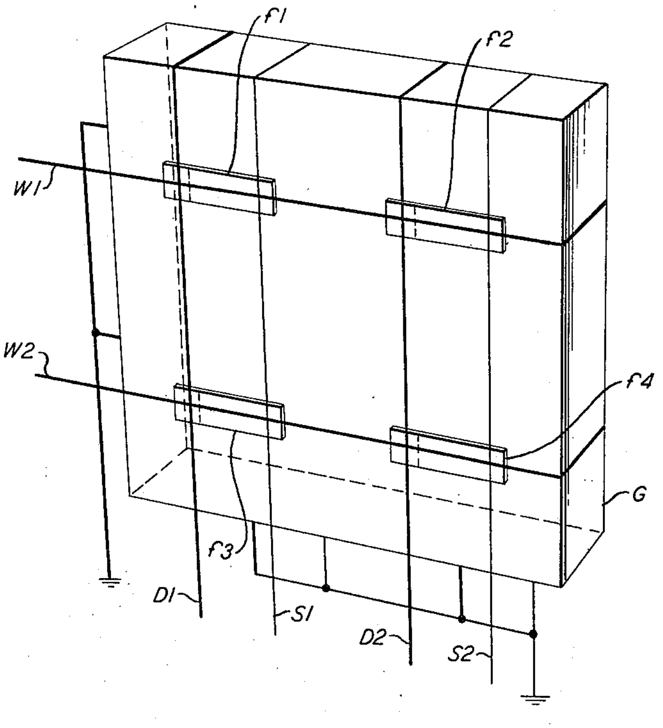
FIG. 5 is a schematic illustration of a thin film spot embodiment in accordance with this invention.

A thin film arrangement in accordance with this invention is illustrated in FIG. 5. The figure shows, illustratively, four spots of thin film $f1$, $f2$, $f3$, and $f4$ deposited on a glass plate G in positions at intersections between word solenoids W1 and W2 and digit solenoids D1 and D2. Each solenoid loops the associated thin films providing a closely-spaced return path confining the fields generated about the solenoids to a portion of the film spot called the bit location. Typically, the bit location extends little beyond the width of the digit (and word) solenoid which is for example 30 mils wide as demarcated in FIG. 5 by broken vertical lines on the film spots. The designations for the various conductors are identical to those used for corresponding elements as shown in FIGS. 1 through 3. The film spots are shown in FIG. 5 extended to the right in the direction of the word conductors beyond the limits of the bit location. Sense conductors S1 and S2 couple associated spots at the extreme right thereof typically 20 mils removed from the corresponding digit conductor and beyond the limits of the corresponding bit location. The various conductors are connected between drivers (not shown) and ground as in FIG. 1 and operation is entirely analogous to that described in connection with FIGS. 1 through 3, with the exception that one intersection between word and digit solenoids, rather than four intersections, corresponds to each bit location. It is to be understood that one, two, or more intersections may define a bit location in accordance with the principles of this invention and that the specific arrangements shown are just illustrative of these possibilities. The advantages of each such arrangement are well understood in the art.

Figure 6:
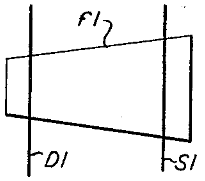
FIG. 6 is an illustration of an alternate configuration for the thin film spots of the embodiment of FIG. 5.

As was the case with the waffle-iron type configuration, the memories utilizing thin film spots in the absence of waffle-iron posts and base plates may also have flux spreading encouraged therein. The shape of an illustrative spot $f1$ in which flux spreading is encouraged is shown in FIG. 6. The spot can be seen to increase in width (up and down as viewed in the figure) as it approaches the sense conductor S1 providing field variations thereacross exactly as described for the overlay film in connection with FIG. 4. Typically, the film spot increases from, for example, 15 to 30 mils. Although this shape is different from what might be expected from a consideration of the waffle-iron embodiment with shaped posts, the shape described is dictated by demagnitizing fields about the film in the absence of posts. The field across the film becomes lower as the film becomes narrower in the direction of the digit conductor, a result which is understood when it is remembered that the word solenoid is, illustratively, not reduced in cross section and remains 30 mils wide whereas the spot is reduced to 15 mils at the sense conductor.

What has been described is considered to be only illustrative of the principles of this invention. Accordingly, various and other arrangements may be devised by one skilled in the art without departing from the spirit and scope of this invention.

What is claimed is:

1. In combination, a thin magnetic film having hard and easy directions for flux therein and a switching threshold, pluralities of first and second conductors defining bit locations in said film, said film being characterized by the reorientation of flux in areas thereof beyond corresponding bit locations into directions indicative of the easy direction to which flux within the corresponding bit location rotates essentially simultaneously in response to energization of coordinate first and second conductors, means for selectively energizing coordinate first and second conductors for rotating flux in corresponding bit locations to a hard and then to easy directions, a plurality of third conductors disposed such that they are essentially isolated from the effect of signals even in excess of said switching threshold applied to corresponding second conductors yet coupled to said areas beyond corresponding bit locations for providing signals when the flux in said areas is rotated to a hard direction.

2. A combination in accordance with claim 1 wherein said thin film is continuous.

3. A combination in accordance with claim 1 wherein said thin film comprises a plurality of thin film spots.

4. A combination in accordance with claim 3 wherein each of said thin film spots are elongated in the direction of said first conductors beyond said bit locations, said third conductors overlying the elongated area of said spots.

5. A combination in accordance with claim 4 wherein the width of each of said spots is enlarged at said area thereof coupled by one of said third conductors.

6. In combination, a base plate of relatively low reluctance material having rows and columns of posts thereon, a thin magnetic film juxtaposed with said posts, said film having hard and easy directions for flux therein, pluralities of first and second conductors threaded between said rows and columns of posts respectively defining bit locations in said thin film, said film being characterized by the reorientation of flux in areas beyond corresponding bit locations into directions indicative of the easy direction to which flux within the corresponding bit location rotates essentially simultaneously in response to energization of coordinate first and second conductors, means for selectively energizing coordinate pairs of said first and second conductors for rotating flux in corresponding bit locations to hard and then to easy directions, and a plurality of third conductors essentially isolated from corresponding second conductors yet coupled to said areas beyond corresponding bit locations for providing signals when the flux in said areas is rotated to a hard direction.

7. A combination in accordance with claim 6 wherein said first and second conductors form loops about rows and columns of posts respectively providing four intersections between each coordinate pair thereof for defining a single bit location in said thin film.

8. A combination in accordance with claim 6 wherein each of said third conductors is spaced apart one column of posts from the corresponding second conductor.

9. A combination in accordance with claim 6 including a layer of metal overlying said thin film for providing eddy current damping of magnetic fields generated by currents in said second conductors.

10. A combination in accordance with claim 7 wherein said metal is aluminum.

11. A combination in accordance with claim 6 including means for encouraging flux in said areas external to bit locations to rotate to easy directions indicative of the easy directions to which flux within corresponding bit locations rotate essentially simultaneously.

12. A combination in accordance with claim 6 wherein said posts are shaped to provide variations in the field in the overlay therebetween to encourage the rotation of flux in said areas external to bit locations to easy directions indicative of the easy directions to which flux within corresponding bit locations rotate essentially simultaneously.

13. A combination in accordance with claim 8 wherein the posts of the columns of posts spacing apart said second and third conductors are shaped to define between adjacent ones thereof a thin film portion of diminishing width toward said third conductor for providing a varying field thereacross in response to the energization of coordinate pairs of first and second conductors.

14. A combination in accordance with claim 6 wherein the posts of the columns of posts between which said third conductors are threaded are shaped to define between adjacent posts a thin film portion of varying width for providing a varying field thereacross in response to the energization of coordinate pairs of first and second conductors.

References Cited

UNITED STATES PATENTS 3,161,862 12/1964 Williams ------------ 340—174

JAMES W. MOFFIT, Primary Examiner